Patented Feb. 1, 1949

2,460,783

UNITED STATES PATENT OFFICE 2,460,783

PREPARATION OF PHTHALOCYANINE PIGMENTS FROM ω-CHLORINE OR ω-BROMINE SUBSTITUTED o-XYLENES

Hans Z. Lecher, Plainfield, and Robert E. Brouillard, Bound Brook, N. J., and Erwin Baumgarten, Staten Island, N. Y., assignors to American Cyanamid Company, New York, N. Y., a corporation of Maine No Drawing. Application June 2, 1947,
Serial No. 751,990

19 Claims. (Cl. 260—314.5)

This invention relates to a new process for preparing phthalocyanine pigments.

Phthalocyanine pigments, particularly copper phthalocyanine have achieved great commercial importance because of their valuable color characteristics. In the past these pigments have been prepared on a large scale from phthalic anhydride or phthalonitrile. These processes have introduced considerable practical difficulties which have been reflected in increased costs.

When the phthalonitrile process is used, expensive and complicated equipment is required for the high temperature catalytic conversion of phthalic anhydride into phthalonitrile. This step is also subject to a considerable explosion hazard because of the danger of cracking ammonia at the high temperatures used.

When phthalic anhydride is used directly without first forming the nitrile, a hard fused reaction mass is obtained which is particularly difficult to stir and heat evenly and involves crushing and grinding operations after the pigment has been formed.

Both of the processes starting from phthalic anhydride or phthalonitrile are also subject to the disadvantage that it is difficult to produce many substituted phthalocyanine pigments. In some cases pigments which are theoretically possible cannot be produced by this method.

The disadvantages of the prior processes for producing phthalocyanine pigments are avoided by the present invention which uses as a starting material omega chlorine or bromine substituted o-xylenes. It is an advantage of the present invention that cheap o-xylene, which is now produced on a large scale from a by-product of petroleum refineries, can be halogenated readily to produce omega chlorine or bromine derivatives and also derivatives which are halogenated in the nucleus as well as the side chain. The halogen which is present in the side chains of the o-xylene must be a reactive easily introduceable halogen. The halogens which are reactive in the process of the invention are either chlorine or bromine.

Various omega chloro or bromo o-xylenes may be used. It is only necessary that there be at least one chlorine or bromine atom in each side chain. Surprisingly enough the process will work with various chlorinated or brominated o-xylenes containing at least 1 chlorine or bromine atom in each side chain. It is not commercially feasible at the present time to produce omega hexahalogen o-xylenes.

Not only is the number of chlorine or bromine atoms in the xylene side chains not critical but it is not necessary that all of the halogen be of one type. Thus, for example, all of the halogen may be bromine or chlorine or they may be mixed. It is possible to prepare omega chlorinated or brominated o-xylene without isolating any particular member which is an added economy. Typical compounds are ω,ω'-dichloro-o-xylene, ω,ω'-dibromo-o-xylene, ω,ω,ω',ω'-tetrachloro-o-xylene, ω,ω,ω',ω'-tetrabromo-o-xylene, ω,ω,ω,ω',ω'-pentachloro-o-xylene, ω,ω,ω',ω'-tetrachloro-3,4,5,6-tetrachloro-o-xylene, and ω,ω,ω',ω'-tetrachloro-3,4,5,6-tetrabromo-o-xylene. The omega polychlorinated or polybrominated o-xylenes may also carry nuclear substituents. Typical of such substituents are fluorine, chlorine, bromine, nitro, carboxy, sulfo and trifluoromethyl.

It is an advantage of the present invention that the omega chlorine or bromine substituted o-xylenes may be prepared by conventional methods which are useful in side chain halogenation. For example, such halogenating agents as chlorine, bromine, sulfuryl chloride, phosphorus pentachloride, and the like, may be employed. In addition, conditions proving side chain halogenation such as irradiation with ultra-violet light and catalysts may also be used when necessary. The degree of replacement of hydrogen atoms in the methyl groups with chlorine or bromine atoms is readily controllable by the customary variations in reaction conditions, it being an added advantage that close or critical control is entirely unnecessary because the exact number of halogen atoms introduced is not critical.

The omega chloro or bromo-o-xylenes react with the same type of nitrogen compounds as does phthalic anhydride to form phthalocyanine pigments. That is to say, they react with compounds such as ammonia and those which are capable of generating ammonia. Such compounds, for example, are urea, guanylurea, biuret, and the like. These compounds need to possess no particular high degree of purity. In fact, mixtures of these compounds give as good or in some cases better yields than do the pure reagents. This is an additional advantage of the process of the present invention.

The nitrogen containing compounds have been described above as including ammonia and compounds which give off ammonia in the reaction. It should be realized, however, that the exact mechanism of the reaction has not been fully determined and it is not desired to limit the invention to a theory that the actual reaction always takes place between ammonia and the omega chloro or bromo o-xylenes. It is possible that actually in some cases the reaction may proceed with some other nitrogen containing group; in fact, there is evidence which makes it probable that in some cases, at least, ammonia does not have to be formed as a compound in the reaction mixture before reaction takes place. The statement that the comound must be capable of generating ammonia in the reaction is, therefore, used to define the compounds which may be used and not necessarily to limit the mechanism of reaction.

The ratios of omega chloro or bromo o-xylene to the nitrogen containing reactants may vary widely although, of course, the nitrogen containing compound must be present at least in stoichiometric amounts. In general, a small excess has been found desirable. The amount of excess will vary somewhat from one reagent to another and also with the conditions of the reaction.

It is an advantage of the present invention that the mode and speed of addition of the nitrogen containing reactant is not critical. For example, the whole amount may be added in a single portion either before or after the omega chloro or bromo o-xylene has been added to the reaction mixture. It is equally feasible to add the nitrogen containing compound in small portions either in the initial stages of the reaction or during the entire period. In fact, the latter procedure must usually be used where the reagent is a gas such as ammonia, for normally it is not feasible to maintain a large amount of a gas sufficient for the whole reaction in the equipment at one time.

The metal phthalocyanines which may be produced by the process of the present invention include copper phthalocyanine, cobalt phthalocyanines and nickel phthalocyanines. That is to say, phthalocyanines of the metals having atomic numbers 27 to 29. A metalliferous reagent containing the desired metal must, of course, be used. Examples of such metalliferous reagents are copper powder, cupric chloride, cuprous chloride, cupric bromide, cupric sulfate, cobalt chloride, nickel chloride and the like. The amount of metalliferous reagent is also not critical although here again at least a stoichiometric amount of the metal bearing compound must be used in order to produce a completely metallized pigment. A small excess is sometimes desirable but large excesses are unnecessarily wasteful, and while they do not interfere with the reaction, any large excess of metalliferous reagent will create an additional separation problem.

The reaction medium may be varied. Good results are obtained when the reactants are fused without the use of any solvents. In many cases, however, an organic solvent is desirable. Excellent results are obtained as far as the reaction is concerned and the solvent also increases the fluidity of the reaction mixture. Various types of organic solvents may be used. We prefer to use organic solvents having a slight oxidizing action, such as, for example, aromatic nitro compounds. Nitrobenzene because of its ready availability is one of the best solvents to use, and it exerts a particularly beneficial effect. It is by no means necessary to add enough solvent to dissolve all of the reactants. On the contrary, the amount of solvent which renders the reaction mixture fluid and stirrable is quite adequate.

It is another advantage of the present invention that temperature control is not critical. The reaction will proceed within a range of 150–250° C. Optimum temperature will vary with the reagents, the solvent used and the time and speed of reaction desired. Usually optimum results will be obtained within a preferred temperature range of 180–210° C.

The process may be carried out under ordinary pressure or in an autoclave. The latter will normally be advantageous where gaseous or very volatile reagents are employed.

The pigments obtained by the process of the present invention are readily purified and do not introduce any problem which is more difficult than that encountered in the ordinary processes which have been used hitherto. The present invention, therefore, is not concerned primarily with any particular method of isolating or purifying the pigments. The standard procedures may be employed. We have found that a very efficient method is to use filtration followed by washing of the filter cake with solvents such as alcohol and water. The filtration may be of the reaction mixture alone when sufficient solvent has been employed or the reaction mixture may be drowned in water and the resulting slurry may then be filtered.

In addition to the advantages presented by the process of the present invention in the production of known phthalocyanine pigments, it is possible to produce substituted pigments which were hitherto either unknown or not economically produceable. For example, it is not practical to prepare phthalonitriles that are highly halogenated. The o-xylene, which is the ultimate raw material for the process of the present invention, however, is quite reactive and may be extensively substituted. Thus, for example, when a $\omega,\omega,\omega',\omega'$-tetrachloro-3,4,5,6-tetrachloro-o-xylene is used in the present process, hexadecachloro-phthalocyanine pigments are obtained which are valuable green pigments.

The present process, when used with a solvent avoids difficulties attendant on the old methods in which the reaction has become a hard solid mass. In the preferred modification of the present invention a final product is obtained which can be isolated without crushing or leaching.

The pigments obtained by the process of the present invention show comparatively high purity and have decidedly bright shades. For many purposes they require no further treatment. However, the pigments may be purified or conditioned in the usual ways. For example, by acid pasting and wet or dry grinding and blending. The pigments are also susceptible to treatment with a crystallizing liquid such as xylene followed by grinding with a dry-grinding agent in order to produce solvent stable pigments.

The invention will be illustrated in greater detail in conjunction with the following specific examples. The parts are by weight.

*Example 1*

A mixture of 20 parts of $\omega,\omega,\omega,\omega'\omega'$-pentachloro-o-xylene, 20 parts of urea, 3 parts of cupric chloride and 67 parts of nitrobenzene is refluxed until pigment formation is complete. The reaction mixture is filtered hot and the filter cake is washed successively with nitrobenzene, acetone, dilute hydrochloric acid, dilute sodium hydroxide, and water. The copper phthalocyanine thus obtained dries to give a bright blue pigment of excellent quality which may be conditioned further by acid pasting or other suitable means.

In the above example similar good results are obtained when cupric bromide or cuprous chloride is substituted for cupric chloride. In a similar way biuret or guanylurea may be used in place of urea.

Example 2

5 parts of $\omega,\omega,\omega',\omega'$-pentachloro-o-xylene, 10 parts of urea, and 1.8 parts of copper sulfate were heated, with stirring, at 180–200° C. until pigment formation was complete. The reaction mixture was cooled, ground, and successively extracted with alcohol, acetone, dilute hydrochloric acid, sodium hydroxide, and water. The copper phthalocyanine is dried to give a bright blue pigment of excellent properties which may be further conditioned by acid pasting or other suitable methods.

Example 3

A mixture of 15 parts of $\omega,\omega,\omega',\omega'$-tetrabromo-o-xylene, 10 parts of urea, 1.5 parts cupric chloride, and 67 parts of nitrobenzene is refluxed until pigment formation is complete. The hot reaction mixture is filtered and the filter cake washed successively with nitrobenzene, acetone, dilute hydrochloric acid, dilute sodium hydroxide, and water. The product is dried to give a bright blue copper phthalocyanine pigment of excellent quality which may be further conditioned by acid pasting.

Example 4

A mixture of 10 parts of 3,4,5,6-tetrachloro-o-xylene and 0.5 part of phosphorus pentachloride in heated to 250° C. and irradiated with ultraviolet light while 58 parts of chlorine is introduced over a period of about 5 hours. The mixture is cooled, ground, and recrystallized from alcohol to give a product which melts at 148–150° C. and is, according to its analysis, $\omega,\omega,\omega',\omega'$-tetrachloro-3,4,5,6-tetrachloro-o-xylene. It is converted to a green phthalocyanine pigment by the method described in Example 1.

Example 5

A mixture of 3.5 parts of copper sulfate and 67 parts of nitrobenzene is saturated with ammonia at atmospheric pressure. 20 parts of $\omega,\omega,\omega,\omega',\omega'$-pentachloro-o-xylene is added and the mixture is heated at reflux with the continuous passage of ammonia, until pigment formation is complete. The reaction mixture is filtered while hot and the filter cake is washed successively with nitrobenzene, acetone, dilute hydrochloric acid, dilute sodium hydroxide, and water. The copper phthalocyanine is dried to give a bright blue pigment of excellent quality which may be acid pasted.

In the above example, the same good results are obtained when cupric chloride is substituted for cupric sulfate.

Example 6

A mixture of 112 parts of nitrobenzene and 3 parts of cupric chloride is saturated with ammonia at atmospheric pressure. 10 parts of $\omega,\omega,\omega',\omega'$-tetrachloro-o-xylene is added and the mixture heated at reflux with the continuous passage of ammonia until pigment formation is complete. The reaction mixture is filtered while hot and the filter cake washed successively with nitrobenzene, acetone, dilute hydrochloric acid, dilute sodium hydroxide, and water. The copper phthalocyanine obtained is a bright blue pigment of excellent properties which may be further conditioned by acid pasting.

Example 7

10 parts of $\omega,\omega,\omega,\omega',\omega'$-pentachloro-o-xylene, 10 parts of urea, 50 parts of nitrobenzene and 1.5 parts of cobaltous chloride were heated, with stirring, at reflux temperature until pigment formation was substantially complete. The hot reaction mixture is filtered and the filter cake washed successively with nitrobenzene, acetone, dilute hydrochloric acid, dilute sodium hydroxide, and water. The product is dried to give a bright blue copper phthalocyanine pigment of excellent quality which may be further conditioned by acid pasting.

Example 8

10 parts of $\omega,\omega,\omega,\omega',\omega'$-pentachloro-o-xylene, 50 parts of nitrobenzene, and 1.5 parts nickelous chloride are mixed and the mixture heated at reflux temperature with the continuous passage of ammonia until pigment formation is complete. The reaction mixture is filtered while hot and the filter cake washed successively with nitrobenzene, acetone, dilute hydrochloric acid, dilute sodium hydroxide, and water. The copper phthalocyanine obtained is a bright blue pigment of excellent properties which may be further conditioned by acid pasting.

What we claim is:

1. A process for preparing phthalocyanine pigments which comprises reacting an omega halogeno o-xylene having at least one halogen atom in each methyl group the halogen having an atomic weight of at least 35 and not more than 80, at a temperature from 150–250° C., with a compound selected from the group consisting of ammonia and compounds capable of generating ammonia at the reaction temperature and mixtures thereof and a metalliferous reagent, the metal of which has an atomic number of 27 to 29.

2. A process for preparing phthalocyanine pigments which comprises reacting an omega halogeno o-xylene having at least two halogen atoms in each methyl group the halogen having an atomic weight of at least 35 and not more than 80, at a temperature from 150–250° C., with a compound selected from the group consisting of ammonia and compounds capable of generating ammonia at the reaction temperature and mixtures thereof, a metalliferous reagent, the metal of which has an atomic number of 27 to 29.

3. A process for preparing phthalocyanine pigments which comprises reacting an omega chloro o-xylene having at least one chlorine atom in each methyl group, at a temperature from 150–250° C., with a compound selected from the group consisting of ammonia and compounds capable of generating ammonia at the reaction temperature and mixtures thereof, a metalliferous reagent, the metal of which has an atomic number of 27 to 29.

4. A process for preparing phthalocyanine pigments which comprises reacting an omega chloro o-xylene having at least two chlorine atoms in each methyl group, at a temperature of 150–250° C., with a compound selected from the group consisting of ammonia and compounds capable of generating ammonia at the reaction temperature and mixtures thereof and a metalliferous reagent, the metal of which has an atomic number of 27 to 29.

5. A process for making copper phthalocyanine pigments which comprises reacting an omega halogeno substituted o-xylene having at least one halogen atom in each methyl group the halogen having an atomic weight of at least 35 and not more than 80 at a temperature of from 150–250° C. with a compound selected from the group consisting of ammonia and compounds generating ammonia at reaction temperature and mixtures thereof in an organic solvent in the presence of a cupriferous reagent.

6. A process for making copper phthalocyanine pigments which comprises reacting an omega halogeno o-xylene having at least two halogen atoms in each methyl group the halogen having an atomic weight of at least 35 and not more than 80 at a temperature of from 150–250° C. with a compound selected from the group consisting of ammonia and compounds generating ammonia at reaction temperature and mixtures thereof in an organic solvent in the presence of a cupriferous reagent.

7. A process for making copper phthalocyanine pigments which comprises reacting an omega chloro-o-xylene having at least one chlorine atom in each methyl group, at a temperature of from 150–250° C. with a compound selected from the group consisting of ammonia and compounds generating ammonia at reaction temperature and mixtures thereof in an organic solvent in the presence of a cupriferous reagent.

8. A process for making copper phthalocyanine pigments which comprises reacting an omega chloro-o-xylene having at least two chlorine atoms in each methyl group at a temperature of from 150–250° C. with a compound selected from the group consisting of ammonia and compounds generating ammonia at reaction temperature and mixtures thereof in an organic solvent in the presence of a cupriferous reagent.

9. A process according to claim 7 in which gaseous ammonia is employed in the recation.

10. A process according to claim 8 in which gaseous ammonia is employed in the reaction.

11. A process according to claim 7 in which urea is used as the ammonia generating compound.

12. A process according to claim 8 in which urea is used as the ammonia generating compound.

13. A process according to claim 6 in which the organic solvent is nitro benzene.

14. A process according to claim 7 in which the organic solvent is nitro benzene.

15. A process according to claim 7 in which the reaction is with a gaseous ammonia and the solvent is nitro benzene.

16. A process according to claim 7 in which the ammonia generating compound in urea and the organic solvent is nitro benzene.

17. A process for making copper phthalocyanine which comprises reacting $\omega,\omega,\omega,\omega',\omega'$-pentachloroxylene with urea in nitrobenzene at 150–250° C. in the presence of cupric chloride.

18. A process for making copper phthalocyanine which comprises reacting $\omega,\omega,\omega,\omega',\omega'$-pentachloroxylene with gaseous ammonia in nitrobenzene at 150–250° C. in the presence of cupric chloride.

19. A process for making hexadecachloro copper phthalocyanine which comprises reacting $\omega,\omega,\omega',\omega'$-tetrachloro-3,4,5,6-tetrachloro-o-xylene with urea in nitrobenzene at 180–210° C. in the presence of cupric chloride.

HANS Z. LECHER.
ROBERT E. BROUILLARD.
ERWIN BAUMGARTEN.

No references cited.